Sept. 2, 1958 M. GREEN 2,850,585

BRIDGE TYPE POWER AMPLIFIER

Filed Dec. 31, 1954 2 Sheets-Sheet 1

INVENTOR,
MILTON GREEN.

BY Harry M. Saragovitz

ATTORNEY.

INVENTOR,
MILTON GREEN.

BY Harry M. Saragovitz
ATTORNEY 2,850,585

BRIDGE TYPE POWER AMPLIFIER

Milton Green, Little Silver, N. J., assignor to the United States of America as represented by the Secretary of the Army Application December 31, 1954, Serial No. 479,258

8 Claims. (Cl. 179—171)

(Granted under Title 35, U. S. Code (1952), sec. 266)

The invention described herein may be manufactured and used by or for the Government for governmental purposes without the payment of any royalty thereon.

The present invention relates to improved bridge type power amplifiers using non-linear circuit elements in a modulator circuit connection. Amplifiers of this general type are well known in the prior art but tend to be characterized by excessive power consumption during periods when no signal is passed therethrough. The improved amplifier disclosed herein is highly efficient in this respect, consuming a minimum amount of power in the absence of a signal and automatically regulating the amount of power drawn from the supply in accordance with the input signal requirements.

It is an object of the present invention to provide non-linear element power amplifier systems of high efficiency.

It is a further object of the invention to provide non-linear amplifier systems in which the power drawn from the supply is automatically regulated by the signal requirements.

A still further object of the invention is to provide amplifier systems inherently capable of demodulating suppressed carrier, double sideband, voltage waveforms.

Figure 1:
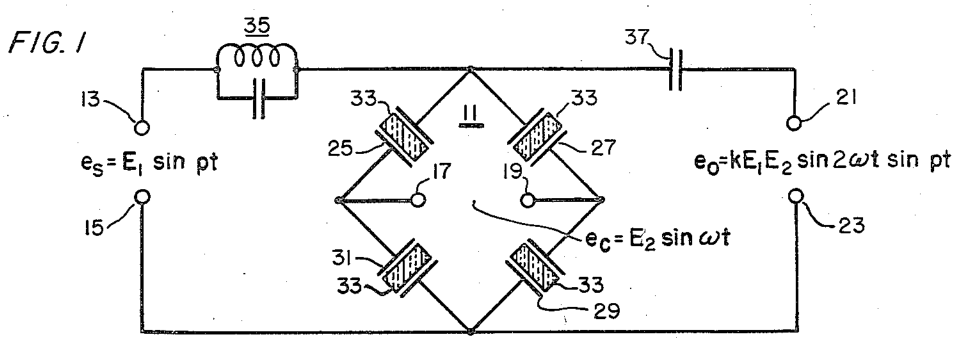
Figure 2:
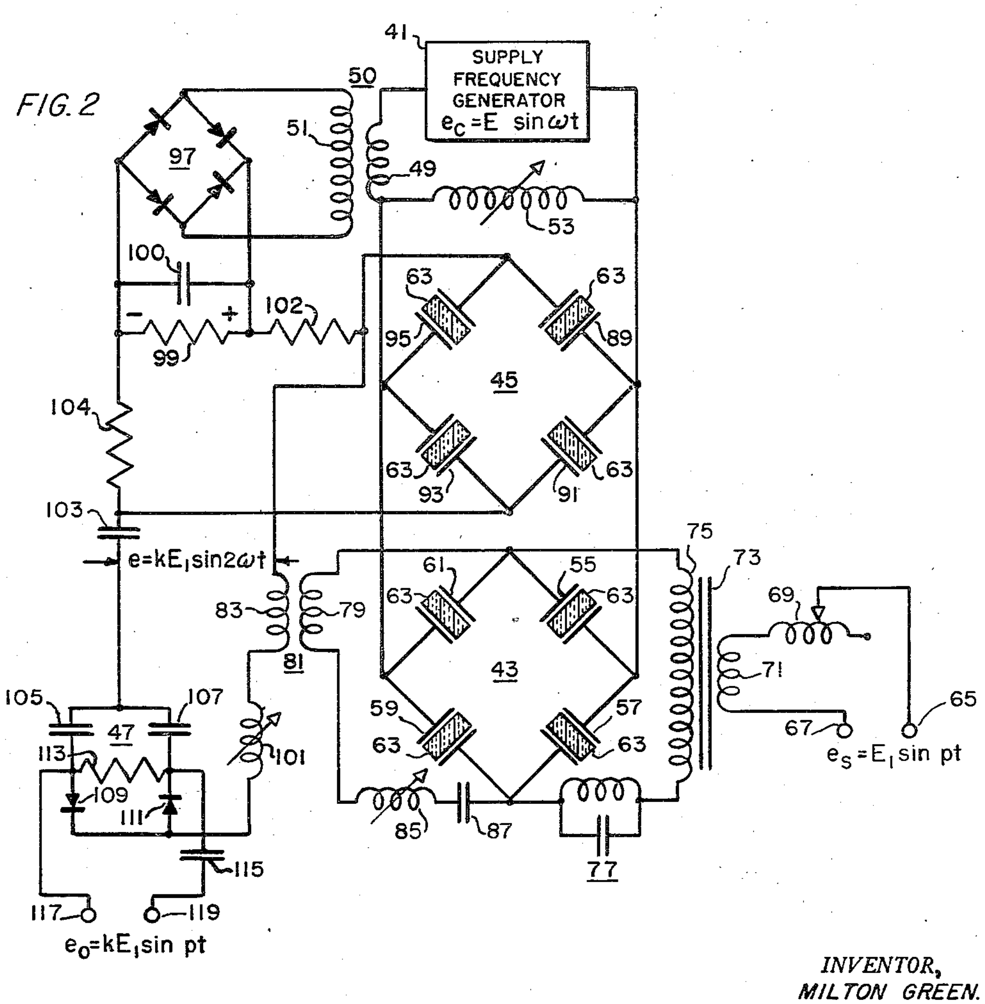
Figure 3:
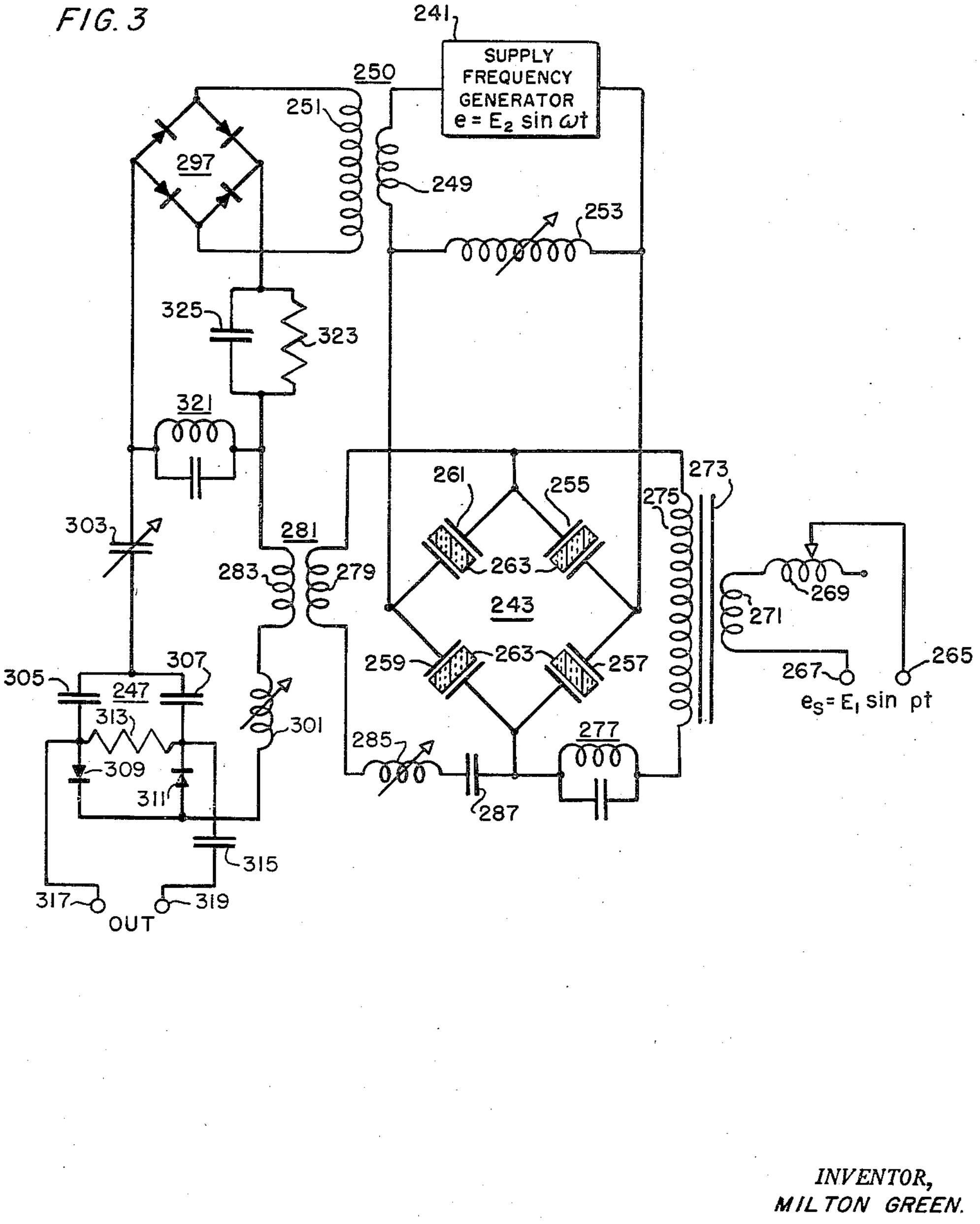

These and other objects of the invention will become more readily apparent as the same becomes better understood from the following detailed description and the accompanying drawings wherein, Fig. 1 is a simplified schematic drawing of a basic form of circuit used in the present invention which is used for the purposes of explanation, Fig. 2 is a schematic diagram of one modification of an amplifier circuit constructed in accordance with the principles of the invention, and Fig. 3 is a schematic diagram of another amplifier circuit constructed in accordance with the principles of the invention.

Attention is first directed to the basic form of circuit illustrated in Fig. 1. This circuit is essentially a modulator utilizing a bridge circuit 11 made up of non-linear impedance elements as the modulating apparatus. A signal or input voltage of the form $e_s=E_1 \sin pt$ is applied to a pair of input terminals 13 and 15 and a supply voltage of the form $e_c=E_2 \sin \omega t$ is applied to a second pair of terminals 17 and 19. The modulated output voltage is taken from a pair of output terminals 21 and 23.

The bridge circuit 11 is made up of four identical condensers 25, 27, 29 and 31, each forming a single arm of the bridge circuit. The condensers 25, 27, 29 and 31 are all of a type having a dielectric material 33 which possesses a dielectric constant which varies in a non-linear fashion with the voltage applied to the condenser. Examples of dielectric materials which exhibit this effect are ceramic materials such as titanates of barium or strontium and particularly dielectrics formed of single crystals of these compounds.

The circuit components used in the bridge 11 will be determined by the values of supply and signal frequencies used. A bridge of the type shown in Fig. 1, constructed for use with a supply frequency of from 500 kilocycles per second to one megacycle per second, used non-linear condensers of 0.001 micro-farad in the bridge and a coupling condenser at 37 of 0.001 micro-farad. These values are not critical however, and other values of supply frequency may be used with a modification of the circuit constants.

The input terminals 13 and 15 are connected across one diagonal of the bridge circuit 11 through a parallel resonant wave trap 35 which is tuned to twice the frequency of the supply voltage $e_c$. The supply voltage is applied to the other diagonal of the bridge 11 through terminals 17 and 19 which are connected thereto. Output terminals 21 and 23 are connected to the same diagonal of the bridge as the input terminals through a condenser 37.

The parallel resonant wave trap 35 offers a high impedance to twice the frequency of the supply source, $e_c$, and hence prevents any voltage having a frequency of this order from coupling to the input circuit. It offers a low impedance however to frequencies of the order of the signal voltage, $e_s$, and the input from terminals 13 and 15 is therefore coupled to the bridge 11.

The condenser 37 connected between the bridge 11 and output terminals 21 and 23 serves a similar function. It offers a very high impedance to the low frequency signal voltage, $e_s$, and hence prevents coupling of this voltage to the output terminals. It offers a low impedance, however, to the high frequencies of the modulated output from the bridge circuit 11 and these frequencies are therefore coupled to the output terminals.

The operation of the circuit of Fig. 1 will be described for two conditions of use or applied voltage conditions.

If an alternating signal voltage of the form, $e_s=E_1 \sin pt$, is applied to the input and a supply voltage of the form, $e_c=E_2 \sin \omega t$, is applied to the terminals 17 and 19, a modulated output voltage is obtained at output terminals. This modulated voltage is of the form, $e_o=kE_1E_2 \sin pt \sin 2\omega t$, where $k$ is a constant. This voltage consists only of an upper sideband component of an angular frequency $(2\omega+p)$ and a lower sideband component of an angular frequency $(2\omega-p)$. Since the supply source is connected to bridge terminals which are conjugate to the load or output terminals the supply frequency is suppressed in the output. Also, since the condenser bridge arms are non-linear the circuit exhibits frequency doubling characteristics, as may be seen from the fact that the sidebands in the output are in terms of the signal frequency $p$ and $2\omega$, rather than $\omega$. The upper and lower sideband frequencies only are present however, in the modulator circuit output. The carrier frequency of $2\omega$ is suppressed, and does not appear in the output voltage.

The second condition of operation which applies to the circuit of Fig. 1 is that in which a direct current signal voltage is applied to the input terminals 13 and 15. Under this condition of operation no sideband frequencies are produced at the output terminals 21 and 23 since there is no signal frequency present in the system. The frequency doubling effect previously mentioned occurs however, and the output voltage at terminals 21 and 23 has a frequency twice that of the supply frequency and of a magnitude proportional to the magnitude of the voltage applied at input terminals 13 and 15. The output voltage is therefore of the form, $e_o=k_1E_1E_2 \sin 2\omega t$, where $k_1$ is a constant.

With the above described basic circuit operations in mind, attention is now directed to the amplifier circuit of Fig. 2 which is an amplifier circuit embodiment constructed in accordance with the principles of the invention.

The amplifier of Fig. 2 is made up of four major elements, namely, a power supply source 41, a signal modulator bridge 43, a frequency doubler or carrier generating bridge 45, and a detector circuit 47. The power supply source 41 may be any conventional alternating current generator such as a vacuum tube oscillator and amplifier, an Alexanderson type low R. F. generator, or a mechanically driven capacitance type generator, for example. The supply source is connected through the primary 49 of a close coupled, step-up, current transformer 50 to one diagonal of the bridge circuits 43 and 45. A variable inductance 53 is shunted across the diagonals of the two bridge circuits which are connected to the supply source 41. The inductance 53 is of such value as to allow tuning of the parallel circuit comprising it and the effective capacitance of the two bridge circuits to resonance at the frequency of the supply source 41. This tuning is done with the bridges in a quiescent state, i. e., with no input signal applied to the system.

The modulator bridge 43 is formed of four condensers 55, 57, 59 and 61, each condenser forming an arm of the bridge. The condensers are of a type employing a dielectric material 63 which exhibits non-linear dielectric constant characteristics with changes in applied voltage. The condensers will be more fully described hereinafter. A signal input circuit is connected to the bridge diagonally opposite that to which the supply source 41 is connected. This signal input circuit is composed of a pair of input terminals 65 and 67 which are connected through a variable inductance element 69 to a primary 71 of an input transformer 73. Secondary winding 75 of the input transformer 73 is connected through a wave-trap 77 to the diagonal terminals of the bridge 43 remote from the supply terminal diagonals. The wave trap constitutes a parallel resonant circuit tuned to a frequency of $2\omega$ or twice the input frequency to the bridge 43, but offering a low impedance to the signal frequency $p$ applied to input terminals 65 and 67.

An output circuit for bridge 43 is connected to the same terminals as the signal input circuit. The output circuit includes a primary winding 79 of an output transformer 81 connected to the bridge through a variable inductance 85 and a condenser 87. The inductance and condenser may be tuned to present a high impedance to the signal frequency applied to input terminals but a low impedance to $2\omega$ or twice the bridge input frequency.

The frequency doubler bridge 45 is also connected across the supply source 41. This bridge is similar in nature to the bridge 43 and is made up of four condenser elements 89, 91, 93 and 95 each having a dielectric member 63 of the same characteristics as previously described. The secondary 51 of the step-up current transformer 50 is connected to the input terminals of a bridge rectifier circuit 97 whose output terminals are connected to a parallel connected resistor 99 and a condenser 100. The resistor 99 and condenser 100, having a voltage developed across them of the polarity indicated by the positive and negative signs, are connected across the diagonal of the voltage doubler bridge 45 opposite to that connected to the source 41, through a pair of resistors 102 and 104. The condenser 100 and resistors 102 and 104 acting in conjunction with the effective capacitance of bridge 45 serve as a filter to remove alternating components from the direct current input to bridge 45. A further circuit is connected across the same terminals of the bridge 45 and includes the secondary 83 of the output transformer 81, a variable inductance element 101, a bridge detector circuit 47 and condenser 103. The detector 47, which may be of any type known to the prior art, is here shown as a full-wave bridge circuit. The bridge is made up of a pair of condensers 105 and 107 and a pair of rectifiers 109 and 111 connected in a full wave circuit with a resistor 113 connected across the output terminals thereof. The output circuit of the bridge 47 is coupled through a condenser 115 to a pair of output terminals 117 and 119. The condensers 103 and 115 both serve as blocking condensers to prevent the flow of direct currents in the circuits in which they are included.

The operation of the circuit of Fig. 2 will now be described. The circuit is connected as shown, without any signal voltage applied to terminals 65 and 67. The variable inductance element 53 is then adjusted so that the parallel circuit comprising this inductance and the effective capacitances of the two bridges 43 and 45 is tuned to resonance at the frequency of the source 41. A minimum current then flows from the source through transformer primary 49 to the bridges and the inductance.

A signal voltage is then applied to the terminals 5 and 67. The variable inductance element 69 is used to tune the input circuit of the amplifier, that is to balance out the effective capacitive reactance of the modulator bridge. For a reasonable band pass width the Q of this circuit must be low and resistive loading may be employed either in the primary or secondary circuit in a known manner to secure this effect. If a sharply tuned circuit is desired the transformer may be dispensed with and a direct input connection from the terminals 65 and 67 through inductance 69 to the bridge 43 may be used. As has been explained in the case of the basic circuit, a modulated voltage output appears at the bridge terminals which is composed of two sidebands; the sum of twice the frequency of source 41 and the signal frequency, and the difference of twice the frequency of source 41 and the signal frequency. The sideband frequencies are blocked from the signal input circuit by the wave trap 77 which is tuned to twice the supply frequency and hence presents a relatively high impedance to both sideband frequencies. A relatively low impedance path for these frequencies exists in the output circuit which includes the condenser 87, the inductance element 85, and the primary 79 of the transformer 81. The variable inductance element 85 may be used to tune the output circuit in the same manner as the input circuit to balance out the effective capacitive reactance of the bridge 43 and the high pass filter condenser 87.

The output of the bridge 43, consisting of sideband components only, requires the addition of a carrier for detection purposes. The carrier voltage is obtained from the bridge 45 which operates in the manner of the basic circuit of Fig. 1 when used as a direct current biased frequency doubler circuit. The direct current bias is obtained from the bridge rectifier circuit 97 and is applied to the diagonal of the bridge 45 opposite to that to which the source 41 is connected. The output of bridge 45, an alternating current of twice the frequency of source 41, is fed through the blocking condenser 103 and the secondary 83 of the output transformer 81 to the bridge detector circuit 47. The variable inductance element 101 is also included in the circuit so that the effective capacitive reactance of bridge 45 plus any series capacitance resulting from 103 and the detector bridge circuit may be balanced out. The sideband output of the bridge 43 and the carrier output of the bridge 45 are added in this series connection for application to the detector. The output of the detector circuit is of the signal frequency and is coupled to the output terminals 117 and 119 through the coupling condenser 115.

It is important for the purposes of detection of the combined sidebands and carrier that the magnitude of the carrier be larger than that of the sideband components. This requirement is automatically met by the circuit of Fig. 2. The bridge supply circuit is, as explained above, tuned to resonance and hence minimum current is drawn in the absence of signal voltage. When a signal voltage is applied to the modulator bridge 43 the supply circuit is detuned by an amount proportional to the signal magnitude and the current flow in the supply circuit is therefore correspondingly increased. The voltage across the secondary 51 of the current transformer 50 rises to supply a larger voltage to the bridge rectifier 97. This results in a larger direct current voltage across resistor 99 which is applied as the input to the frequency doubler bridge 45. The increased direct current input voltage results in a larger alternating current output at twice the frequency of source 41 from the bridge 45. The larger the signal applied to input terminals 65 and 67 the larger will be the carrier voltage output from bridge 45. The circuit automatically functions so that, no matter what the magnitude of the applied signal, the carrier component applied to detector 47 will always be larger than the sideband component. The required balance of carrier and sideband components for proper detection is always preserved with a minimum of current drain in the absence of an impressed input signal voltage.

The condensers used in the bridges 43 and 45 determine the overall characteristics of the system. These condensers must employ a dielectric material which has a non-linear voltage-dielectric constant characteristic, and the greater the variation in dielectric constant of the material with applied voltage the more gain can be obtained from the circuit. Dielectric materials composed of barium and/or strontium titanates exhibit this effect and are suitable for use in this circuit. Single crystal dielectrics of these compounds show a larger change in dielectric constant with applied voltage and hence are more desirable for high gain applications.

Fig. 3 illustrates a second modification of a power amplifier constructed in accordance with the principles of the invention. The circuit of this modification is similar in many respects to that of Fig. 2 and the corresponding circuit elements have accordingly been designated by similar reference characters, the number 200 being added to the reference character designation used in Fig. 2.

The amplifier of Fig. 3 is made up of a power supply source 241, a frequency doubler rectifier system 297, a signal modulator bridge 243 and a detector circuit 247. The supply source 241 is connected through the primary winding 249 of a close-coupled current transformer 250 to one diagonal of the bridge circuit 243. A variable inductance 253 is shunted across the diagonal of the bridge 243 which is connected to the supply source. The inductance 253 is used to tune the circuit comprising it and the effective capacitance of the bridge 243 to resonance at the frequency of the supply source. The tuning is done with the bridge 243 in a quiescent state, i. e., with no signal input applied to the system.

The modulator bridge 243 is made up of four identical condensers 255, 257, 259 and 261. These condensers are of the non-linear type employing a dielectric material 263 which is the same as that previously described for the circuits of Figs. 1 and 2. The signal input to the modulator bridge is applied to input terminals 265 and 267 which are connected through a variable inductance element 269 to a primary 271 of an input transformer 273. The secondary winding 275 of transformer 273 is connected to the opposite diagonal of the bridge 243 to that to which the supply source is connected.

An output circuit is connected to the same terminals of the bridge 243 as the signal input circuit. The output circuit includes a primary winding 279 of an output transformer 281 connected to the bridge through a variable inductance 285 and a condenser 287. The inductance and condenser may be tuned to present a high impedance to the signal frequency applied to the input terminals but a low impedance to the bridge output frequency.

The secondary winding 251 of the current transformer 250 is connected to the rectifier bridge 297 as in the modification of Fig. 2. The output circuit of the rectifier bridge differs from that of Fig. 2 and is made up of a parallel resonant circuit 321 in series with a resistor 323. The resistor 323 is shunted by a condenser 325.

The secondary winding 283 of the output transformer 281 is connected in series with the parallel resonant circuit 321 and through a variable condenser 303 and a variable inductance 301 to a bridge detector circuit 247. The detector circuit is of a full wave type and is made up of a pair of condensers 305 and 307 and a pair of rectifiers 309 and 311. A resistor 313 is connected across the output diagonal of the detector bridge and this resistor in turn is connected through a condenser 315 to the output terminals 317 and 319.

The operation of the modulator bridge circuit 243 of Fig. 3 is the same as that previously described for the bridge 47 of Fig. 2. It produces a double sideband suppressed carrier output voltage which appears in the secondary 283 of the output transformer 281. As in the modification of Fig. 2 the carrier must be supplied for detection purposes and the magnitude of the carrier voltage must be larger than the bridge output voltage.

The carrier voltage is obtained in this modification from the output of the rectifier circuit 297 whose input is derived from the current transformer 250. As in Fig. 2, a signal input applied to the input of the modulator bridge detunes the bridge supply circuit which includes the inductance 253. This increases the bridge input current and so increases the supply to the rectifier bridge 297.

It will be thus apparent that the rectifier bridge circuit 297 is energized from the source 241 by an alternating voltage of the frequency of the supply or $\omega$. The full-wave bridge rectifier circuit produces an output containing a direct current component and an alternating current component or ripple frequency of twice the frequency of the supply, or $2\omega$.

The output terminals of the bridge rectifier circuit are connected to the parallel resonant circuit 321. This circuit is tuned to resonance at the frequency $2\omega$. Maximum voltage at the double or ripple frequency therefore appears across the parallel resonant circuit and this voltage is used to supply the carrier frequency required for detection of the modulator bridge output sidebands. The resonant circuit 321 is connected in series with the secondary winding 283 of the output transformer 281 and is connected to the input of the detector bridge through variable inductance 301 and variable condenser 303.

It will be apparent that in the case of Fig. 3 that the magnitude of the carrier voltage increases automatically with an increase in signal input to, and the output signal from, the modulator bridge 243. The condenser 303 included in the combining circuit is made adjustable in this modification. It serves the dual purpose of blocking the D. C. component of the output of the rectifier bridge and at the same time adjusting the relative phasing of the carrier or A. C. component of the rectifier bridge output. The purpose of the variable inductances 285 and 301 and their function is the same as that described for inductances 85 and 101 of Fig. 2.

The mixed double sideband modulator bridge output voltage and the double frequency rectifier bridge output are applied to the detector circuit 247. The detector circuit functions to produce a signal output at terminals 317 and 319 exactly as in the previously described modification.

While the systems have been described as using non-linear capacitance elements in the modulator and frequency doubler bridge circuits, it will be readily apparent to those skilled in the art that other circuit elements possessing non-linear characteristics may be used in their place. The bridges could, for example, employ saturable reactors in the arms thereof in which case the resonant tuning would be achieved by means of a variable condenser connected across the leads from the supply source. The tuning to balance out effective reactances of the bridge circuits would also be accomplished by the use of variable condensers.

It will be apparent from the foregoing description that the bridge amplifier circuits constructed in accordance with the present invention are characterized by simplicity and relatively high efficiency at all values of signal input. The automatic regulation feature reduces power consumption to a negligible amount during idle period and so prevents not only power waste but also circuit element deterioration due to excessive heating.

While there has been described what are at present considered to be the preferred embodiments of this invention, it will be apparent to those skilled in the art that various changes and modifications may be made therein without departing from the invention, and it is therefore the aim of the appended claims to cover all such changes and modifications as fall within the true spirit and scope of the invention.

What is claimed is:

1. An amplifier comprising a modulator bridge having four arms connected in series at four terminals, each arm including a non-linear impedance component and the terminals constituted as diagonal pairs, means for impressing an alternating current voltage to a pair of said diagonal terminals, means for impressing a signal voltage to be amplified to a second pair of diagonal terminals, a detector, means for obtaining a signal voltage containing the upper and lower sideband frequency components from said second pair of diagonal terminals, means for combining a carrier frequency voltage having a frequency equal to double the frequency of said alternating current voltage with said signal voltage and for impressing the combined signal upon the input of said detector and output means connected to said detector from which an amplified signal may be taken from said detector.

2. An amplifier comprising a bridge having four arms each containing an impedance element that varies non-linearly with voltage applied thereacross and four terminals said arms connected in series at said terminals the terminals forming a first and second pair of diagonal terminals, means for applying an alternating current voltage to a first pair of said diagonal terminals for cyclically varying the impedance of said impedance elements, means for applying a signal voltage to be amplified to a second pair of said diagonal terminals whereby a signal having frequency components representing the sum and difference of the frequencies of the alternating current voltage and the signal voltage appears as an output at said second pair of terminals, means for producing an alternating current carrier voltage having twice the frequency of the first mentioned alternating current voltage, means for combining the alternating current carrier voltage of twice the frequency with the output voltage of said second pair of diagonal terminals to form an amplified modulated signal and means for demodulating said combined amplified signal to produce an amplified signal having the same frequency as the input signal.

3. An amplifier comprising a modulator bridge having four arms connected in series and providing two pairs of diagonally arranged terminals, each arm having a capacitor with a dielectric that has a constant that is variable non-linearly with voltage applied thereacross, means for supplying an alternating current voltage to one pair of said diagonally arranged terminals, means for applying a signal to be amplified to a second pair of said diagonally arranged terminals, means for generating an alternating current voltage having twice the frequency of said first mentioned alternating current voltage, means for combining the signal output from said second pair of diagonally arranged terminals and said alternating current voltage having twice the frequency, and means for demodulating said combined amplified signal to produce a signal having the same frequency as the signal supplied to said pair of diagonally arranged terminals and greater amplitude than said signal.

4. An amplifier comprising an alternating current source, a frequency doubling bridge for doubling the frequency of said alternating current source connected to said alternating current source, means responsive to the current demand from said alternating current source for providing a direct current voltage proportional to said current demand connected to said frequency doubling bridge, a modulator bridge, means for feeding an alternating current voltage from said alternating current voltage source to said modulator bridge, means for impressing a signal voltage to be amplified upon said modulator bridge, a detector, means for combining the output voltages from said frequency doubler bridge and said modulator bridge and impressing said combined voltage upon said detector and means for obtaining a signal from said detector.

5. An amplifier comprising a modulator bridge having four arms each arm having a capacitor therein said capacitor having a dielectric having a constant that varies non-linearly with voltage impressed thereacross, and four terminals arranged in diagonal pairs, said arms connected in series at said terminals, a frequency doubler bridge having four arms each arm having a capacitor therein said capacitor having a dielectric constant that varies non-linearly with voltage impressed thereacross and four terminals arranged in diagonal pairs, said arms connected in series at said terminals, means for impressing an alternating current voltage on a first pair of said diagonal terminals of each of said bridges, means for impressing a direct current on a second pair of diagonal terminals of said frequency doubler bridge, means for impressing a signal voltage to be amplified to a second pair of said diagonal terminals of said modulator bridge, a detector, means for combining the output voltages from each of the bridges and connecting the combined output to said detector, and means for obtaining a signal from said detector.

6. An amplifier comprising a modulator bridge having four arms and four terminals arranged in diagonal pairs each arm having a capacitor therein the dielectric thereof having a constant that varies non-linearly with the voltage applied thereacross, said arms connected in series at said terminals, a frequency doubler bridge having four arms and four terminals arranged in diagonal pairs each arm having a capacitor therein the dielectric thereof having a constant that varies non-linearly with voltage applied thereacross, said arms connected in series at said terminals, an alternating current source including a current transformer in the output thereof, means connecting the output of said alternating current source through the current transformer to a first pair of diagonal terminals of each of said bridges, means deriving energy from said current transformer for providing a direct current voltage to a second pair of diagonally arranged terminals of said frequency doubler bridge, means for impressing a signal voltage to be amplified to a second pair of diagonal terminals of said modulator bridge, a detector, means for combining and connecting the output signal from the second pair of diagonal terminals of each of said bridges to said detector, and terminal means for obtaining signal from said detector.

7. An amplifier comprising a pair of bridges, each bridge having four arms and four terminals, each arm having circuit elements therein having non-linear impedance characteristics and connected in series at said terminals, said terminals arranged in diagonal pairs, a tunable inductor, an alternating current source, means connecting said source said tunable inductor and a pair of said diagonal terminals of each bridge in parallel, a source of direct current voltage, means connecting said direct current voltage source to a second pair of diagonal terminals of one of said bridges, means connecting a signal to be amplified to a second pair of diagonal terminals of the other of said bridges, a detector, means connecting the outputs from the second pair of diagonal terminals of each of said bridges to said detector, and terminal means connected to said detector for providing an amplified signal.

8. An amplifier comprising an alternating current voltage source, a current transformer having a primary and secondary winding, a frequency doubler bridge provided with four arms connected in series at four terminals each arm having an impedance element therein that varies non-linearly with the voltage applied thereacross, a modulator bridge provided with four arms connected in series at four terminals each arm having an impedance element therein that varies non-linearly with the voltage applied thereacross, said terminals of said bridges being arranged in diagonal pairs, a tunable inductor, means connecting the alternating current voltage source in series with the primary winding of said current transformer and the alternating current voltage source and current transformer in parallel with the tunable inductor and a pair of diagonal terminals of each of said bridges, means connected to the secondary of said current transformer and to a second pair of diagonal terminals of said frequency doubler bridge for impressing a direct current voltage thereon, means for impressing a signal to be amplified across a second pair of terminals of said modulator bridge, a detector, means for combining the output voltages of the second pair of diagonal terminals of each of said bridges for impressing an amplified voltage signal upon said detector, and terminal means connected to said detector from which an amplified signal is obtained.

References Cited in the file of this patent

UNITED STATES PATENTS

| | | |
|---|---|---|
| 2,191,315 | Guanella | Feb. 20, 1940 |
| 2,470,893 | Hepp | May 24, 1949 |
| 2,682,640 | Harling | June 29, 1954 |